United States Patent [19]

Marko

[11] 4,070,661
[45] Jan. 24, 1978

[54] PHOTO ELECTRONIC DIRECTION OF MOTION INDICATOR

[75] Inventor: Adolf R. Marko, Fairborn, Ohio

[73] Assignee: The United States of America as represented by the Secretary of the Air Force, Washington, D.C.

[21] Appl. No.: 656,918

[22] Filed: Feb. 10, 1976

[51] Int. Cl.$^2$ ............................................. G01D 5/34
[52] U.S. Cl. ................................. 340/271; 250/209; 250/233
[58] Field of Search .......................... 340/267 R, 271; 250/209, 231 R, 231 SE, 233, 231 GY

[56] References Cited

U.S. PATENT DOCUMENTS

| | | | |
|---|---|---|---|
| 2,685,082 | 7/1954 | Beman et al. | 250/233 |
| 2,788,519 | 4/1957 | Caldwell | 340/271 |
| 2,944,157 | 7/1960 | McAuslan et al. | 250/231 SE |
| 3,304,434 | 2/1967 | Koster | 340/271 |
| 3,423,597 | 1/1969 | Delp | 250/231 R |
| 3,567,945 | 3/1971 | Appleby | 250/209 |
| 3,912,926 | 10/1975 | Coulbourn | 250/231 SE |
| 3,947,682 | 3/1976 | Mumme | 250/231 R |

Primary Examiner—John W. Caldwell, Sr.
Assistant Examiner—Joseph E. Nowicki
Attorney, Agent, or Firm—Joseph E. Rusz; Robert Kern Duncan

[57] ABSTRACT

Two, adjacent, but circumferentially displaced, photodetectors radially positioned exterior to a rotating body sense the changes in the intensity of light impinging on the detectors emanating from a defined source on the periphery of the rotating body. The sequentially changing outputs of the photodetectors are compared in a comparator circuit which provides a triangular wave shape output signal having either a sharp leading edge or a sharp trailing edge depending upon the sequence of activation of the photodetectors by the rotating light signal. The triangular wave is differentiated providing either positive going spike pulses or negative going spike pulses depending on whether the rotating body was moving clockwise or counterclockwise. The output of the differentiator is displayed on an oscilloscope to visually indicate by the presence of either positive or negative going spike pulses the direction of rotation of the rotating body.

1 Claim, 12 Drawing Figures

PHOTO ELECTRONIC DIRECTION OF MOTION INDICATOR

RIGHTS OF THE GOVERNMENT

The invention described herein may be manufactured and used by or for the Government of the United States for all governmental purposes without the payment of any royalty.

SUMMARY OF THE INVENTION

The invention provides apparatus for indicating the direction of translatory or rotational motion over a very large range of speeds without mechanically loading the moving item.

DESCRIPTION OF THE PREFERRED EMBODIMENT

Quite frequently with rotational equipment capable of rotation in either direction, it is desirable during operation to know, without interfering with the device, in which direction it is rotating. In some instances the device may have been started rotating sometime previously by another operator and to depend solely on human recollection provides to great a chance for error to occur which could have quite serious results. Typical examples of devices equally capable of rotation in either direction are various centrifuges and electromagnetic radiation scanning devices such as radar antennas and laser beam directors.

Figure 1:
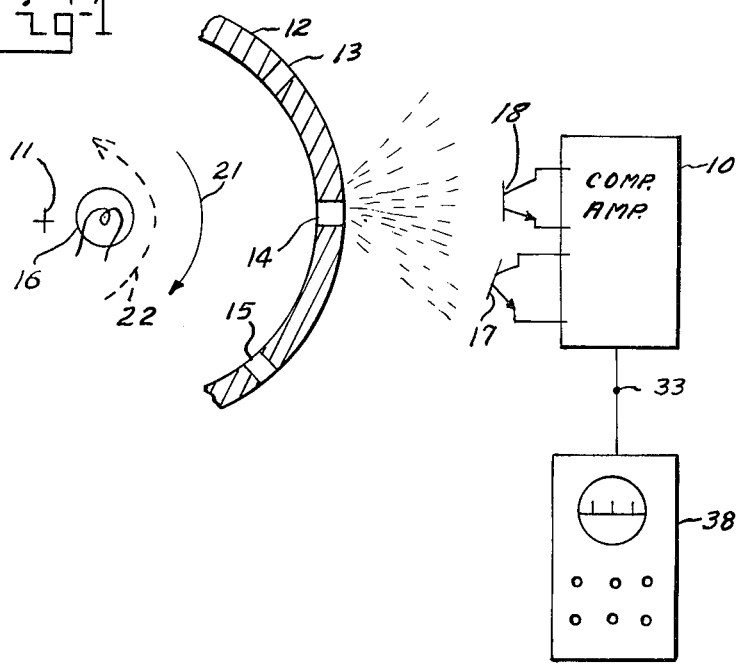
FIG. 1 is a schematic-pictorial representation of an embodiment of the invention having oscilloscope readout.

In a typical embodiment of the invention adapted to a centrifuge for human and animal work a ring with a diameter of 112 centimeters is positioned on the upper part of the centrifuge. 360 holes approximately 6 millimeters in diameter are equally spaced in this ring on a circumference of its periphery and extending through the thickness of the ring. This structure is represented in FIG. 1. The center of rotation 11 for the centrifuge is also the center of rotation of the attached ring 12. Three of the 6 millimeter holes are representatively shown at 13, 14, and 15. One side of the ring is exposed to a light source. In this particular embodiment the light source 16 is positioned inside the rotating ring 12, and the photodetectors 17 and 18 are located outside the centrifuge. These locations of the light source and the photodetectors may be reversed with equally satisfactory operational results.

The light coming through the holes cyclically illuminates the two photodetectors 17 and 18 which in this embodiment are phototransistors. It has been found desirable to position the phototransistors 17 and 18 such that with the ring containing the holes stationary, phototransistor 18 is positioned opposite a hole so as to receive the maximum amount of light, i.e., it has its highest electrical output. Generally, this is on a radial line from the center of rotation through the light source and hole. Phototransistor 17 is then positioned away from this radial so that it is receiving from the same source (hole) approximately 75% of the light that it would receive if the hole 14 is advanced so as to place phototransistor 17 on a radial. (The light source 16 should either be positioned near the center of rotation or the light spread by diffusion so that substantially constant intensity of light emanates from the holes that are sweeping by the phototransistors. The 75% value is not critical but has been found to be a generally optimum value. Whether phototransistor 17 is displaced to the 75% illumination value in a clockwise direction, as shown, or in a counterclockwise direction is also not critical. It would merely reverse the output signals for direction of rotation and thus be a matter of original correlation of indication with the direction of rotation. The rotation of the ring 12 causes a cyclic time variable output from the phototransistors with the output of each being 75% of its maximum value when the output of the other is at its maximum. The phototransistors 17 and 18 produce at points 19 and 20, respectively, a wave shape shown in FIG. 4a for clockwise rotation 21 and in FIG. 4b for counterclockwise rotation 22. The solid curve 40 is the output at point 20 from phototransistor 18 and the dotted curve 41 is the output at point 19 from phototransistor 17. Note that for clockwise rotation the output from phototransistor 18 leads in time the output from phototransistor 17, while for counterclockwise rotation the opposite is true.

Figure 5A:
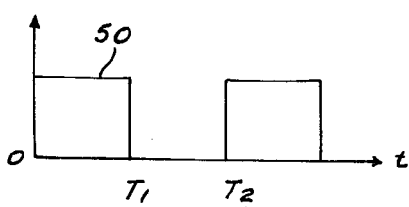
FIG. 5a illustrates a typical signal wave shape at the output of the comparator amplifier for clockwise rotation.
Figure 6A:
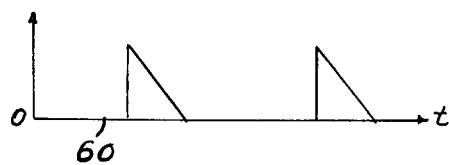
FIG. 6a illustrates a typical signal wave shape at the input to the differentiator for clockwise rotation.
Figure 6B:
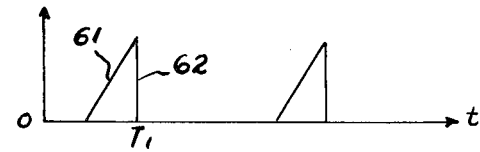
FIG. 6b illustrates a typical signal wave shape at the input to the differentiation for counterclockwise rotation.

The outputs of the phototransistors are connected to the inputs of a conventional comparator 25. Only the input and output connections to the comparator are shown. The output of phototransistor 18 is also connected to the base of transistor 26. The output of transistor 26 is from the emitter through the resistance 27 to point 28, the input to the RC differentiator. Transistor 26, as an emitter follower, is used to provide substantially the same voltage at point 28 as from the output of phototransistor 18 but at a low impedance. The output from the comparator at point 29 is coupled to the base of transistor 30 through resistor 31. In the time span O-$T_1$ (FIG. 4a) the voltage from phototransistor 18 is more positive than the voltage from phototransistor 17. This causes the comparator voltage at point 29 to be high as indicated by curve 50 in FIG. 5a. This high voltage level at point 29 turns transistor 30 full on, practically shorting the signal at point 28 to reference as shown in FIG. 6a by curve 60, during the time interval.

Figure 7A:
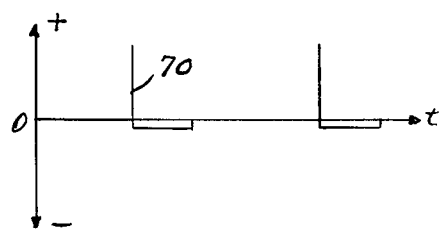
FIG. 7a illustrates a typical output signal from the differentiator for clockwise rotation.

At time $T_1$ the voltage 41 from phototransistor 17 becomes higher (more positive) than the voltage 40 from phototransistor 18, causing the comparator to switch to its low output state and turn switching transistor 30 off. The voltage at point 28 changes rapidly to approximately the value of the output of phototransistor 18 at point 20. This last transition causes a positive pulse 70 as shown in FIG. 7a to appear at point 32, the output of the differentiator, and at point 33 the output of the comparator-differentiator 10.

Figure 4A:
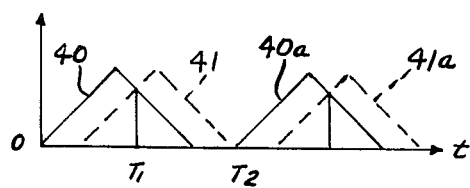
FIG 4a illustrates typical signal wave shapes from the phototransistors for clockwise rotation.
Figure 4B:
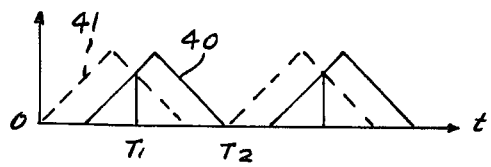
FIG. 4b illustrates typical signal wave shapes from the phototransistors for counterclockwise rotation.
Figure 5B:
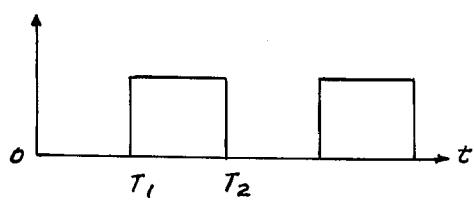
FIG. 5b illustrates a typical signal wave shape at the output of the comparator amplifier for counterclockwise rotation.
Figure 7B:
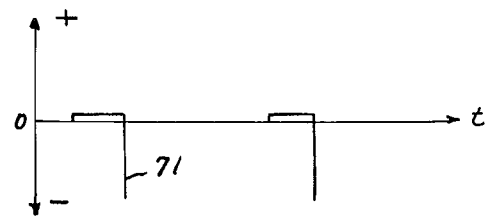
FIG. 7b illustrates a typical output signal from the differentiator for counterclockwise rotation.

At time $T_2$ the comparator switches again to its on state because the voltage from phototransistor 18 becomes more positive than the voltage from phototransistor 17 as is shown by curves 40a and 41a respectively, of FIG. 4a. Transistor 30 is now turned on and effectively shorts points 28 to common. At time $T_2$ there is already zero potential at point 28. Therefore this transition causes no potential change at point 28 and no output at points 32 and 33. This cycle, as represented by FIGS. 4a, 5a, 6a, and 7a, is repeated as long as the photosensors receive varying cyclic illumination in this sequence, i.e., phototransistor 18 receiving maximum illumination first, with phototransistor 17 at that time being at approximately 75% of maximum. With this sequence a train of positive spikes (pulses) as shown in FIG. 7a will be present at the output 33 of the comparator-differentiator. For rotation of the ring 12 in the opposite direction, i.e., counterclockwise, the voltage wave shapes of the signals at these points are shown in FIGS. 4b, 5b, 6b, and 7b. A comparison of FIGS. 4a, 5a, 6a, and 7a with those of 4b, 5b, 6b, and 7b shows that the essential difference brought about by whether the signal from transistor 18 is leading or trailing the signal from transistor 17 is that the sharp edge of the triangular signals at point 28 are reversed. The reason for this reversal with counterclockwise rotation, i.e., when the signal from phototransistor 17 is leading as shown in FIG. 4b, is because the output from the comparator will be zero until time $T_1$, as shown in FIG. 5b. This causes transistor 30 to be off and the signal at point 28 to increase as shown 61 in FIG. 6b. At time $T_1$ the comparator switches to the on state, which turns transistor 30 on and causes a fast transition to zero as shown at 62 in FIG. 6b. When this triangular wave shape with the sharp trailing edge 62 is differentiated a negatively going spike 71 is obtained as shown in FIG. 7b.

Thus, for clockwise rotation with an embodiment of the invention constructed as shown in FIG. 1 a train of positive pluses appear at the output terminal 33, and a train of negative pulses are present for counterclockwise rotation. Generally, it has been found desirable to select the R and C components 35 and 36 of the differentiator to limit the signal amplitude to approximately 5% or less of the amplitude of the wave generated by the comparator transition.

In order to produce the idealized triangular wave form of the phototransistor outputs as shown in FIGS. 4a and 4b, it is necessary that the holes in the ring 12 be rectangular and the windows in the photosensors be rectangular. However, very satisfactory results have been obtained from embodiments in which the holes in the ring 12 were circular and the windows on the photosensors were also circular. The resulting wave forms from the phototransistors are no longer smooth triangles, however, it has been found that the wave form of the transducer signals does not have a significant effect on the performance of the circuit as long as the highest rate of change is less than approximately 10 percent of the rate of change provided by the comparator.

Figure 3:
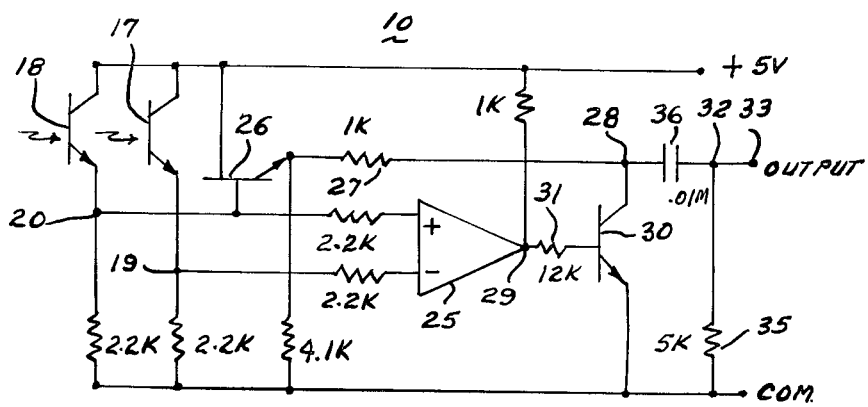
FIG. 3 is a schematic electrical diagram of a typical comparator and differentiator.
Figure 8:
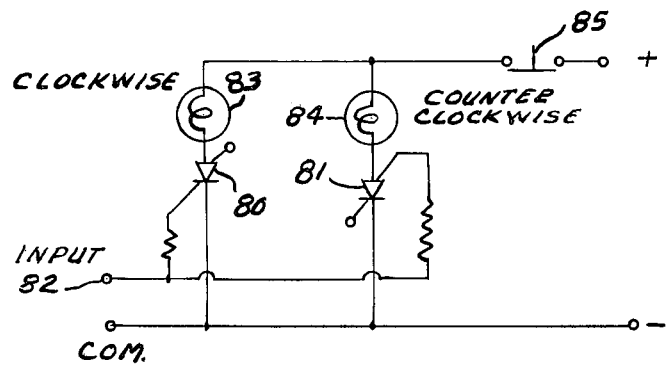
FIG. 8 is a typical silicon control switching circuit for providing illuminated pilot light indication of rotation.

The output from the comparator-differentiator constructed as shown in FIGS. 1 and 3, may be displayed on a conventional oscilloscope 38. In this embodiment positive pulses on the oscilloscope will indicate clockwise rotation of the rotating device and negative pulses will indicate counterclockwise rotation. Instead of using an oscilloscape to indicate direction, pilot lights may be used. The circuit as shown in FIG. 8 illustrates one embodiment utilizing pilot light indicators. Two similar silicon control switches 80 and 81, that have both anode and cathode gates are used. The input terminal 82 of the dual SCS is connected to the output terminal 33 of the comparator-differentiator. (In some instances it may be desirable to use a conventional broad band amplifier between terminals 33 and 82.) The positive pulse will trigger SCS 80 but have no effect on SCS 81. When SCS 80 is fired, indicator light 83 is illuminated indicating clockwise rotation. Likewise negative pulses will fire SCS 81 and light indicator 84. Once fired a silicon control switch stays on until the anode-cathode circuit is effectively broken, hence, it is desirable to include momentary interrupter switch 85 which can be actuated to clear any previous indication. Instead of operating the silicon control switches from a direct current voltage, they may be operated from an alternating current source in which case the indication is effectively cleared every cycle and interrupter switch 85 is not needed.

Figure 2:
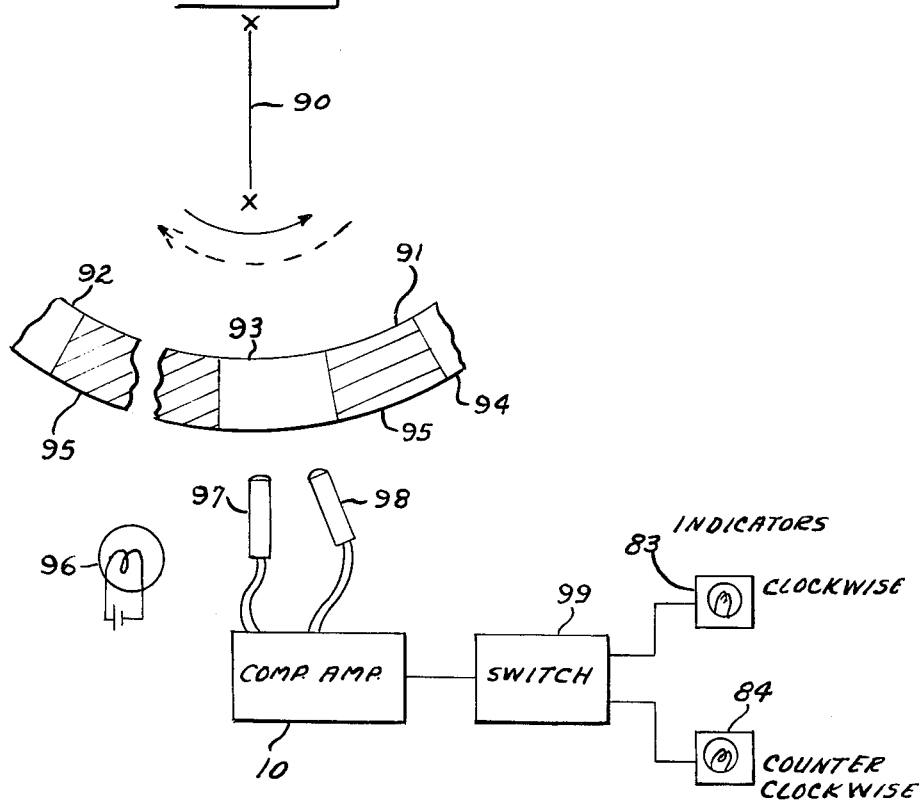
FIG. 2 is a schematic-pictorial representation of an embodiment of the invention having indicator lights displaying the direction of rotation.

Instead of a light shining through holes as shown in the embodiment represented in FIG. 1, alternating stripes of black and white material may be attached to the rotating or moving member and light from a separate source, or ambient light, reflected from the stripes utilized to actuate the photodetectors. FIG. 2 illustrates (looking in and down at an angle) an embodiment of a rotating device rotating about axis 90 and having an encircling band 91 of alternating white stripes such as 92, 93, and 94 separated by black segments 95. It has been found that approximately equal areas of black and white segments around the circumference is generally suitable. Either ambient light or light from a conventional source such as light bulb 96 illuminates the band 91. The photosensor 97 and 98 receive the light reflected from band 91. With movement of the band 91 the photosensors will receive a cyclic sequence of high and low light levels (from the white and black areas respectively) and produce a varying output signal similar to the embodiment represented by FIG. 1. The location of the photosensors with respect to light received is the same, i.e., one at 75% maximum when the other is at a maximum. In the embodiment represented by FIG. 2 a dual SCS switch 99 as detailed in FIG. 8 is used to actuate pilot light indicators 83 and 84.

Typical examples of some of the specific components used in an embodiment of invention are: type MRD 3050 Motorola Phototransistors, type 2N3391 for the two transistors, a Comparator Signetics type NE522A comparator, and GE type number 3N86 L silicon control switches.

I claim:

1. Apparatus for detecting and indicating direction of a rotating body having a center of rotation comprising:
   a. a ring having a plurality of uniformly spaced holes and a center of rotation positioned on the said rotating body and rotating therewith, such that the center of rotation of the said ring is also at the center of rotation of the said rotating body;

b. a light source positioned near the said center of rotation of the said ring providing substantially constant intensity of light emanating from the said holes;

c. a first photosensor positioned exterior to the said rotating body, substantially on a radial line extending from the said center of rotation through the said light source and one of the said plurality of holes receiving light emanating from the said hole and providing positive electrical output;

d. a second photosensor positioned exterior to the said rotating body receiving light emanating from the said hole and providing a positive electrical output, the said second photosensor positioned such that it is away from the said radial when the said first photosensor is on the said radial to provide an electrical output from the said second photosensor that is approximately 75% of the output of the said first photosensor;

e. an electronic comparator responsive to the said electrical outputs of the said first and second photosensors for providing a high output state when the electrical output of the said first photosensor is more positive than the said electrical output of the said second photosensor and to provide a low output state when the electrical output of the said second photosensor is more positive than the electrical output of the said first photosensor;

f. an emitter-follower cooperating with the output of the said first photosensor providing an electrical output at low impedance responsive to the output of the said first photosensor;

g. means including a differentiator cooperating with the said electrical output of the said comparator and the said electrical output of the emitter-follower for providing an electrical output of a positive going pulse for one direction of rotation of the said rotating body and an electrical output of a negative going pulse for the opposite direction of rotation of the said rotating body; and h. means cooperating with the said output of the differentiator for indicating the said direction of rotation.

* * * * *